United States Patent [19]

Nilsson et al.

[11] Patent Number: 5,203,854

[45] Date of Patent: Apr. 20, 1993

[54] MAIN BEARING CAP FOR INTERNAL COMBUSTION ENGINES

[75] Inventors: Lars Nilsson, Torslanda; Kjell Berntson, Mölndal, both of Sweden

[73] Assignee: AB Volvo, Gothenburg, Sweden

[21] Appl. No.: 651,629

[22] Filed: Feb. 6, 1991

[51] Int. Cl.⁵ .................. F16C 35/02; F16C 9/00; F02F 7/00
[52] U.S. Cl. ....................... 384/433; 123/195 R; 384/429
[58] Field of Search .................. 384/429–434; 123/195 R, 195 H, 195 C

[56] References Cited

U.S. PATENT DOCUMENTS

| | | | |
|---|---|---|---|
| 4,412,514 | 11/1983 | Hayakawa et al. | 123/195 R |
| 4,465,041 | 8/1984 | Hayashi | 123/195 R |
| 4,643,145 | 2/1987 | Bolton et al. | 123/195 R |
| 4,651,691 | 3/1987 | Ogawa | 384/432 X |
| 4,693,216 | 9/1987 | Ampferer et al. | 384/433 X |

Primary Examiner—Thomas R. Hannon
Attorney, Agent, or Firm—Burns, Doane, Swecker & Mathis

[57] ABSTRACT

A main bearing cap for an internal combustion engine consists of an aluminum alloy with a steel core (6). The cap has a supporting surface (2) for the bearing shell (3). The supporting surface is the outer surface of a 3 mm thick aluminum layer (10) outside the steel core.

4 Claims, 1 Drawing Sheet

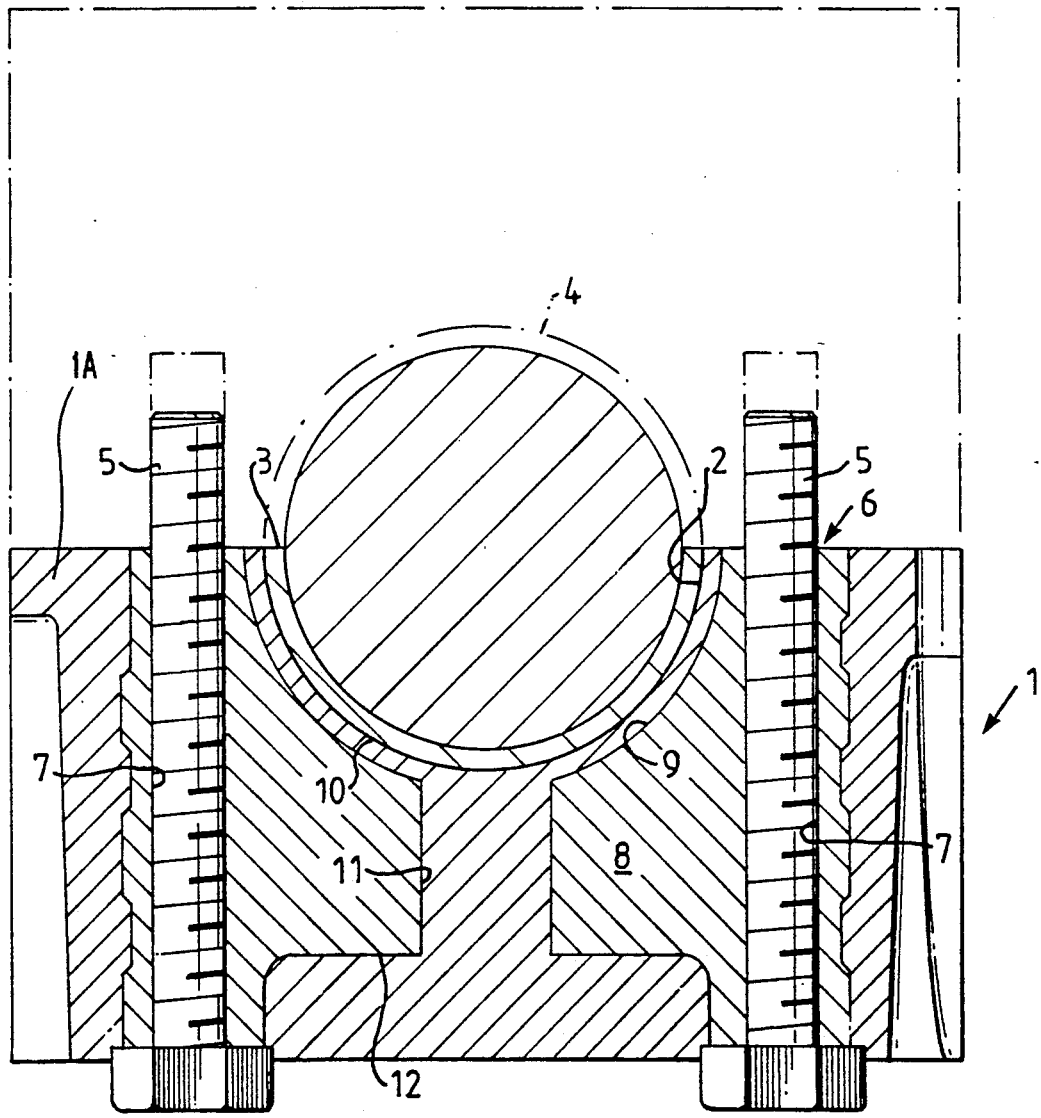

MAIN BEARING CAP FOR INTERNAL COMBUSTION ENGINES

BACKGROUND OF THE INVENTION

The present invention relates to a bearing cap for a main bearing in an internal combustion engine. The cap consisting in part of an aluminum alloy and in part of an iron alloy forming a core in the aluminum material. The core comprises tubular portions with bores for mounting bolts and a portion, located between the tubular portions, in the area of a semi-circular supporting surface for a bearing shell.

It is known to use main bearing caps made entirely in aluminum in aluminum engine blocks to provide a design which is as light as possible. The lowest possible weight can, however, only be achieved at the cost of increased mechanical engine noise due to the greater thermal expansion of the main bearing aluminum material resulting in increased bearing clearance.

It is also known to combine low weight with reduced noise by casting an iron core in the aluminum material, so that the thermal expansion resulting in increased bearing clearance will be less than that in a bearing cap which is made entirely in aluminum. In a previously known design of the type described above by way of introduction, the iron core is made so that it forms a semi-circular surface facing the crank shaft.

When such a surface is to be machined together with its complementary semi-circular surface in an aluminum engine block, this will mean that the machine tool will work during half a revolution in aluminum and during half a revolution in cast iron. Since these materials have very different hardnesses, problems arrive with both tool selection and tool setting, which can give an unacceptable out-of-roundness and straightness of the main bearing bore.

The purpose of the present invention is to achieve a main bearing cap of the type described by way of introduction, which eliminates the problems described above in the milling of the surface of the bearing cap and the complementary surface in the engine block.

SUMMARY OF THE PREFERRED EMBODIMENT

This can be achieved according to the invention by virtue of the fact that the core portion between the tubular portions terminates at a distance from the supporting surface and that the supporting surface is the outer limiting surface of a layer consisting of aluminum alloy outside the iron alloy core.

A bearing cap with an aluminum layer of a few millimeters in thickness has the same desired properties as regards the reduction of thermal expansion in the bearing cap as the known cap reinforced with an iron alloy core. At the same time, machining is appreciably facilitated by virtue of the fact that the tool works in the same material during the entire revolution and thus does not need to be selected and set with regard to differences in the material properties between aluminum and cast iron.

BRIEF DESCRIPTION OF THE DRAWING

The invention will be described in more detail below with reference to an example shown in the accompanying drawing, the FIGURE showing a cross-section through a main bearing cap according to the invention.

DETAILED DESCRIPTION OF A PREFERRED EMBODIMENT

In the FIGURE, 1 generally designates a main bearing cap, which in the example shown is one of several main bearing caps composing a main bearing bridge, but it could just as well be a single regular main bearing cap.

The bearing cap 1 has a semi-circular supporting surface 2 on which a bearing shell 3 rests. In the FIGURE, the dash-dot lines indicate a bearing support section in the engine block with a facing bearing shell 4. The main bearing bridge is mounted securely on the engine block by means of a pair of bolts 5 in each bearing cap.

The bridge composed of a number of bearing caps comprises a body 1A which is cast in aluminum alloy and has in each bearing cap section a cast core 6 of an iron alloy, e.g. steel. The core 6 is essentially in the form of an H with bores 7 for the bolts 5 in tubular lateral portions. The central portion 8 of the core 6 between the bores 7 has a semi-circular upper limiting surface 9, which is concentric with the bearing shell 3. The surface 9 is separated from the bearing shell 3 by an approximately 3 mm thick aluminum layer 10 with the supporting surface 2 for the bearing shell.

A central through-channel 11 extends from the upper surface 9 of the central portion 8 of the central portion 8 of the core to the underside 12 of the core. The width of the channel 11 in the axial direction of the bearing cap is approximately a third of the width of the core. The channel 12 is filled with aluminum so that the aluminum layer 10 forms a continuous mass with the surrounding aluminum material in the bridge.

We claim:

1. In an engine comprising an engine block formed of an aluminum alloy, an a bearing cap attached to said engine block; said engine block including a first semi-circular surface; said bearing cap including a second semi-circular surface; said first and second semi-circular surfaces together forming a circular supporting surface for supporting a bearing shell; said bearing cap comprising a body formed of an aluminum alloy, and a core formed of an iron alloy disposed within said body; said core including holes for receiving bolts to attach said bearing cap to said engine block; a portion of said body and a portion of said core being situated in a region disposed between said holes; said portion of said body forming said second semi-circular supporting surface, whereby each of said first and second semi-circular supporting surfaces is formed of an aluminum alloy.

2. Apparatus according to claim 1, wherein said portion of said body forming said second semi-circular supporting surface comprises a generally semi-circular layer.

3. Apparatus according to claim 2, wherein said layer is of substantially uniform thickness throughout a substantial portion of its circumferential extent.

4. Apparatus according to claim 2, wherein said core includes a central cavity extending through said region, said cavity being occupied by a part of said body which is of one-piece with said layer, said part of said body joining said layer at approximately a mid-point thereof.

* * * * *